United States Patent [19]

Cannon et al.

[11] 4,266,097
[45] May 5, 1981

[54] DEVICE CONTROL SYSTEM

[75] Inventors: Thomas B. Cannon, Thornton; James E. Dalley, Brighton, both of Colo.; Andrew S. George, Ocean Township, Monmouth County, N.J.

[73] Assignee: Bell Telephone Laboratories, Incorporated, Murray Hill, N.J.

[21] Appl. No.: 38,408

[22] Filed: May 14, 1979

[51] Int. Cl.³ .................................... H04M 11/00
[52] U.S. Cl. ............................ 179/2 A; 340/147 R
[58] Field of Search ............... 179/2 R, 2 A, 2 AM, 179/18 AD, 18 B, 18 ES; 340/147 R, 286 R

[56] References Cited

U.S. PATENT DOCUMENTS

| | | | |
|---|---|---|---|
| 3,548,102 | 12/1970 | Schaum et al. | 179/2A |
| 3,702,904 | 11/1972 | Bard | 179/2 A |
| 3,865,984 | 2/1975 | Ewing | 179/2 A |
| 4,021,615 | 5/1977 | James et al. | 179/2 A |
| 4,072,825 | 2/1978 | McLay et al. | 179/18 AD |

Primary Examiner—John H. Wolff
Assistant Examiner—Joseph A. Popek
Attorney, Agent, or Firm—James M. Graziano

[57] ABSTRACT

The disclosed energy control system employs the serving electronic stored program PBX to regulate the operation of energy consuming devices located throughout a hotel/motel or office building in accordance with one or more modes of operation as offered by an algorithm stored in the PBX memory. This is accomplished by equipping each guest room or office with a control circuit to regulate the operation of the energy consuming devices located in that room. These control circuits are activated by the presence of an audio frequency tone on the telephone line associated with the room. To minimize the impact of this scheme on the traffic capacity of the PBX time division switching network, all activated control circuits are concurrently connected to a single time slot, which supplies the required audio frequency tone.

8 Claims, 5 Drawing Figures

| FIG. 4 | FIG. 2 |
| --- | --- |
|  | FIG. 3 |

DEVICE CONTROL SYSTEM

TECHNICAL FIELD

This invention relates to energy control systems and in particular to a control arrangement wherein the electronic stored program PBX itself is employed to regulate the operation of energy consuming devices located throughout the building according to one or more modes of operation as offered by an algorithm stored in the PBX memory.

BACKGROUND ART

There have been numerous prior art control circuit arrangements wherein the remotely located control unit is operated by signals appearing on the telephone line. These prior art remote units include U.S. Pat. No. 3,865,984 to L. L. Ewing issued Feb. 11, 1975. The Ewing patent teaches a remotely operated door lock system wherein a dc signal is supplied to the control unit via the telephone line. This signal appearing on the telephone line enables the control unit which then activates/deactivates a door lock and applies one of two distinctive audible tone signals to the telephone line, thereby indicating the status of the door lock.

Another prior art remote unit is disclosed in U.S. Pat. No. 3,548,102 to G. Schaum et al issued Dec. 15, 1970. The Schaum patent teaches an arrangement for controlling remotely located heating equipment wherein the control unit is connected to the telephone line and is responsive to the receipt of a predetermined number of ringing signals to activate the heating equipment. Additionally, the control unit returns a distinctive audible tone back to the calling party to indicate the status of the heating equipment.

U.S. Pat. No. 3,702,904 to J. F. Bard issued Nov. 14, 1972 teaches a control unit employing a signal counter circuit. The Bard control unit counts the number of ringing signals received and uses the stored count to control a set of switches, which operate the remotely located equipment. The Bard patent, however, concentrates on the use of a guard interval after the receipt of a valid signal to protect against erroneous activation of the control unit by a subsequent call.

An overall system arrangement is also found in U.S. Pat. No. 4,021,615 issued May 3, 1977 to E. C. James et al, which teaches the provision of apparatus for conserving energy in a hotel/motel building. This is accomplished by equipping each office or room in the hotel/motel with a control circuit to regulate the operation of the energy consuming devices located in each room, these energy consuming devices being primarily the heating and air conditioning equipment. The control circuit is connected to the telephone line associated with the guest room and is responsive to the periodic application of an audio frequency signal to the telephone line to discontinue the operation of the energy consuming device located in that room. The control circuit relinquishes supervision and control of the energy consuming device when the periodic audio frequency signal is removed from the telephone line for greater than a predetermined period of time. The control circuit is also disconnected from the telephone line if the telephone is off-hook and a call is in progress, thus preventing the voice frequency signals of the telephone conversation from erroneously triggering the energy control equipment.

Although the foregoing control circuit arrangements are capable of regulating the operation of remotely located apparatus, they all rely on the connection of considerable additional apparatus to the telephone line to achieve this remote control capability. This additional expense renders many of the potential applications of remote control uneconomical.

DISCLOSURE OF THE INVENTION

The foregoing problem is solved and a technical advance achieved by an arrangement which utilizes the inherent capabilities of the existing telephone equipment to drastically reduce the cost of implementing the remote appliance control feature. In particular, an energy control arrangement is disclosed wherein the inherent capabilities of the existing stored program time division private branch exchange (PBX) are advantageously employed to implement the central control function at little additional cost.

This is accomplished by equipping each office or room in a business or hotel/motel with a control circuit to regulate the operation of the energy consuming devices located in each room, these energy consuming devices being primarily the heating and air conditioning equipment. The control circuit is connected to the telephone line associated with the room and is responsive to the presence of an audio frequency signal applied to the telephone line by the PBX to discontinue the operation of the energy consuming device located in that room. The control circuit relinquishes supervision and control of the energy consuming device when the audio frequency signal is removed from the telephone line for greater than a predetermined period of time. The control circuit is also disconnected from the telephone line if the subscriber in the room goes off-hook and places a call, thus preventing the voice frequency signals of the telephone conversation from erroneously triggering the energy control equipment.

In a large telephone switching system, this aforementioned energy control scheme would simultaneously operate numerous energy control units by connecting them to the audio frequency generator. To alleviate the traffic problem that all these simultaneous network connections would cause, the disclosed energy control system connects all operated energy control units to the same time slot in the time division switching network which time slot is also connected to the audio frequency generator. Therefore, the disclosed energy control system has an insignificant effect on the normal telephone traffic level in the telephone switching network.

Thus, the stored program PBX can control the operation of the energy consuming devices located throughout the building based on a program stored in the PBX memory. This program can be structured to accomplish numerous energy control functions such as peak load shedding, hotel check-in/check-out control and time of day control. The stored program PBX and the existing telephone lines are used to activate the individual energy control circuits thereby requiring a minimal amount of additional equipment to implement this energy control scheme while also placing a minimal additional traffic load on the PBX.

DETAILED DESCRIPTION

Figures 1, 5:
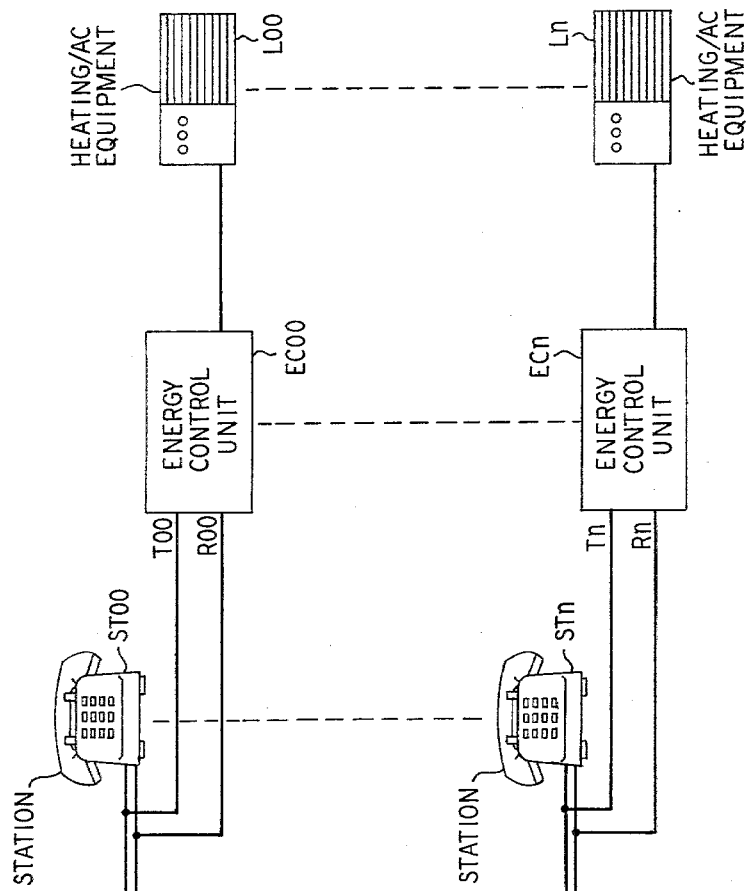
FIG. 1 shows, in block diagram form, the overall system aspects of the disclosed energy control system.
FIG. 5 shows the manner in which FIGS. 2-4 should be arranged.

FIG. 1 illustrates, in block diagram form, the energy control system of our invention which system employs the serving PBX itself as the system controller. It is assumed that stored program time division PBX 100 has a plurality of line circuits, LC00 to LCn each of which serves an associated telephone station set ST00 to STn. Each telephone station set is assumed to be associated with a separate room in a business or a hotel/motel complex and is connected to the associated line circuit by a corresponding communication pair (T00, R00 to Tn, Rn). Also, each of these rooms is assumed to have an energy consuming device associated with it, in particular, a heating or air conditioning unit L00 to Ln as well as an energy control unit EC00 to ECn which is connected to the associated communication pair and which functions to control the operation of the associated heating and air conditioning unit.

The operation of this system can be better understood by describing the operation of a single energy control unit in the system. For example, assume that station ST00 is connected to standard line circuit LC00 of stored program time division PBX 100 via a communication pair T00, R00. Also connected to communication pair T00, R00 is energy control unit EC00 which has connected to it heating and air conditioning unit L00. It is assumed that heating and air conditioning unit L00 is powered by commercial 60 Hz line voltage while control of heating and air conditioning unit L00 is obtained from both the heating and air conditioning unit's internal thermostat (not shown) and energy control unit EC00 which itself is connected to and powered by the same commercial 60 Hz ac line voltage. Energy control unit EC00 enables heating and air conditioning unit L00 to operate under control of its internal thermostat until control unit EC00 receives an appropriate control signal from stored program time division PBX 100. In particular, if a tone of a particular frequency (such as 440 Hz) appears on the communication pair T00, R00 for greater than a predetermined length of time, energy control unit EC00 is activated and terminates the operation of heating and air conditioning unit L00 by overriding the operation of the internal thermostat of heating and air conditioning unit L00.

The energy control system of our invention employs the standard tone trunk 101 and switching network bus 102 of stored program time division PBX 100 to supply this control tone signal to the telephone line T00, R00 associated with the room to be controlled, thereby eliminating the need for additional control circuitry. Thus, stored program time division PBX 100 is itself an integral part of the energy control system. A multitude of telephone lines can be concurrently connected to tone trunk 101 by a single time slot of switching network bus 102 thereby preventing this energy control arrangement from adversely affecting the traffic handling capacity of switching network bus 102.

Figure 2:
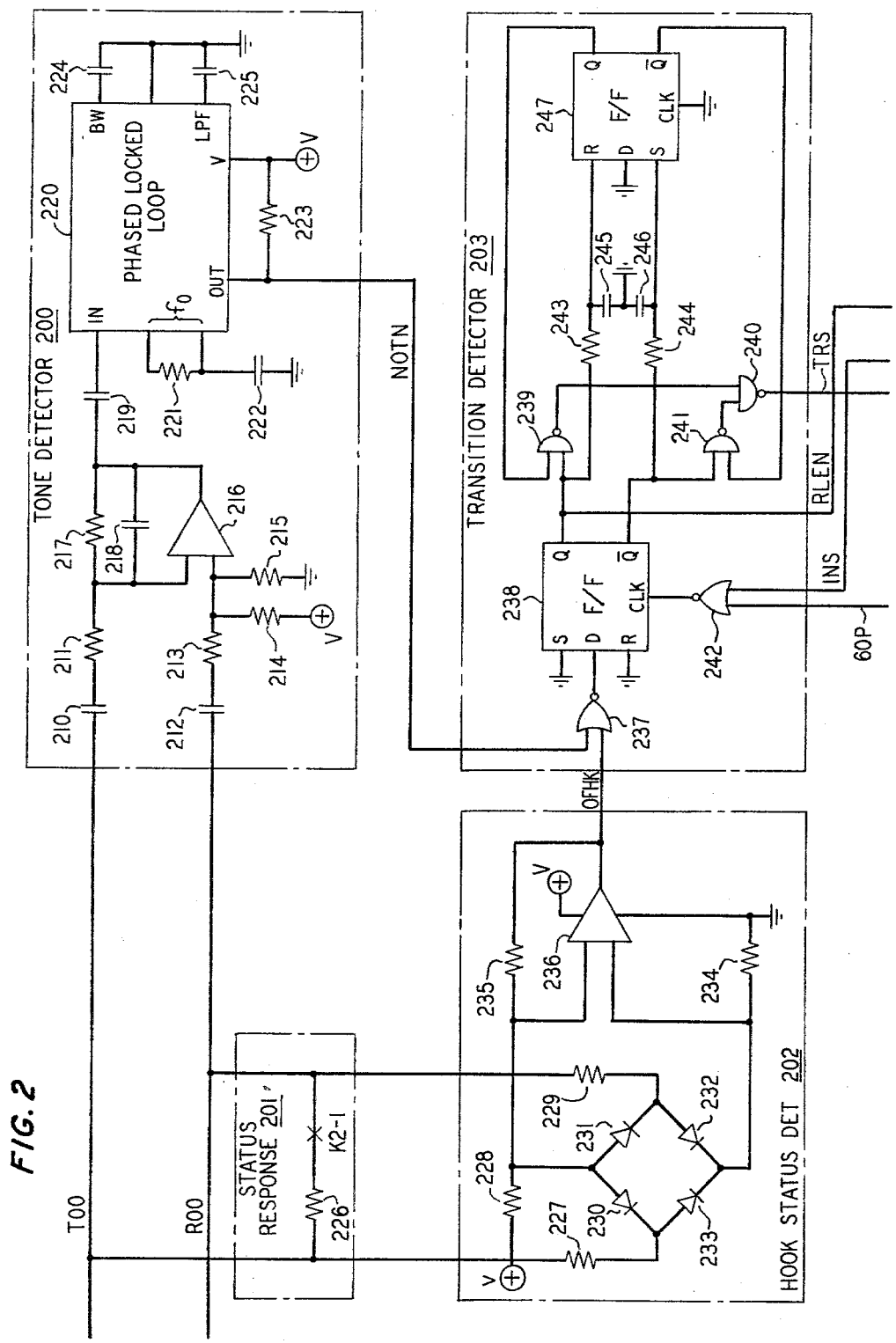
FIGS. 2-4 depict the details of the disclosed energy control system.
Figure 3:
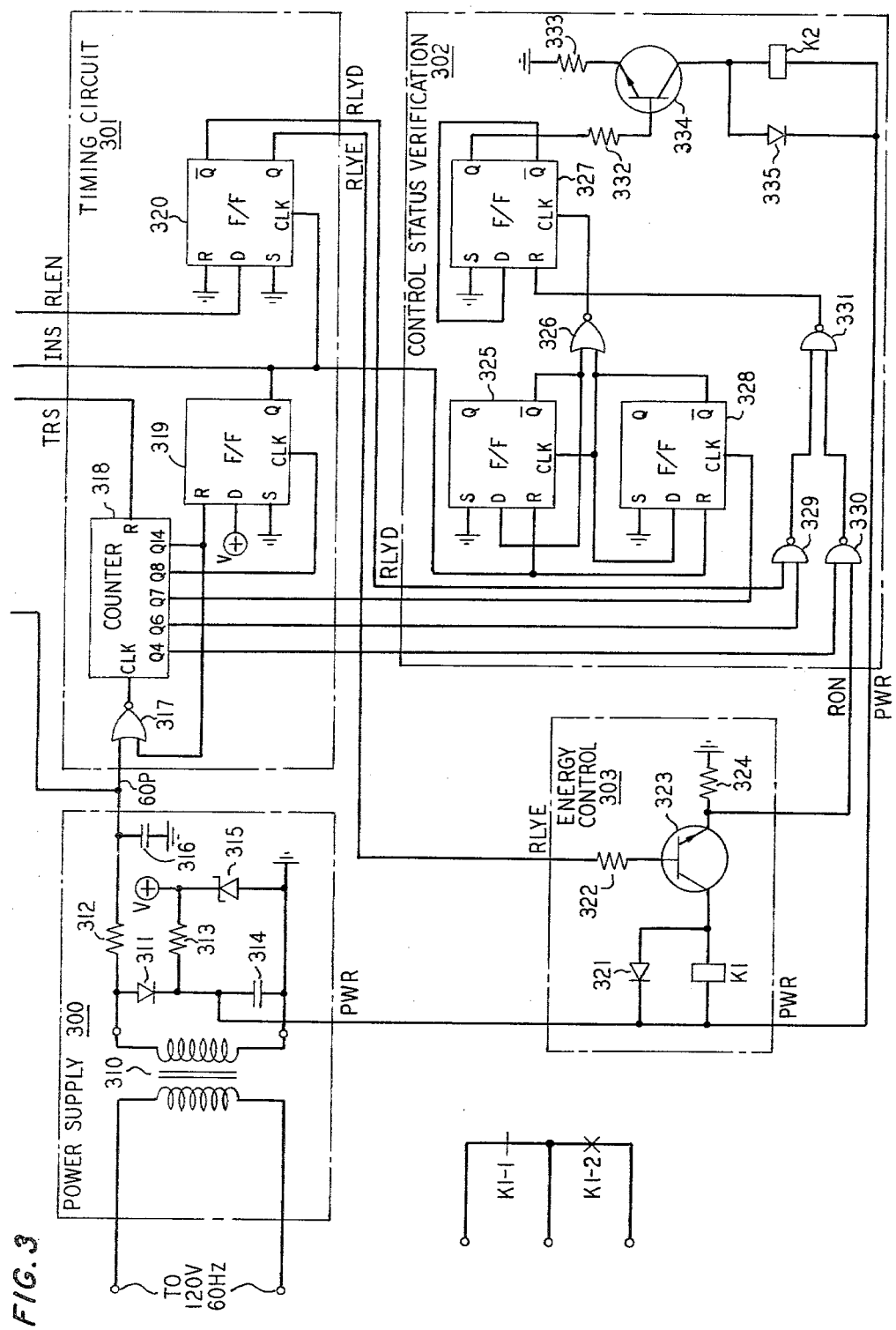
Figure 4:
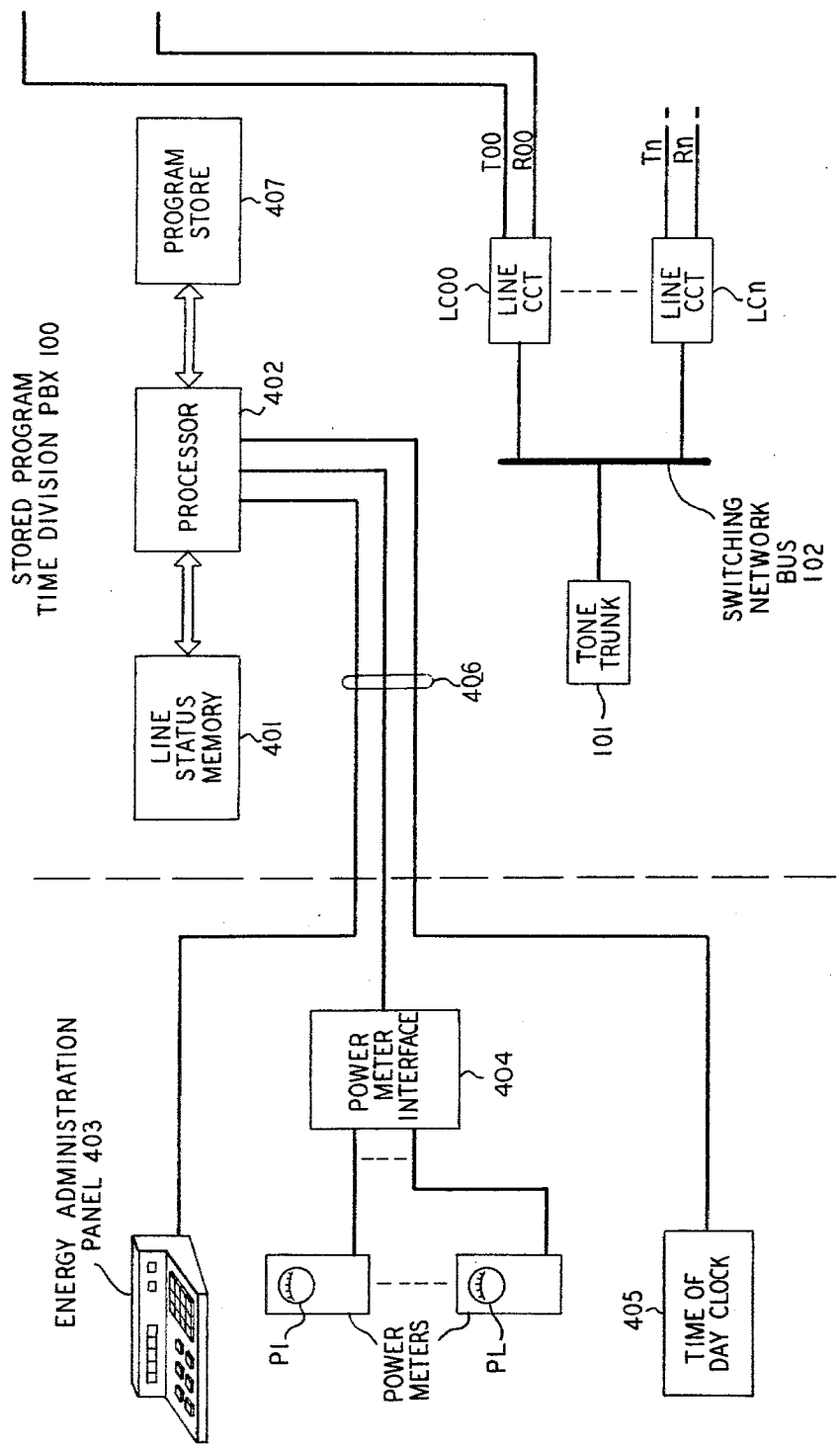

The operation of this energy control system may be further appreciated by describing the operation of the detailed circuit diagram illustrated in FIGS. 2-4. In particular, FIG. 4 shows the details of stored program time division PBX 100 and its associated energy administration equipment which is comprised of time of day clock 405, power meter interface 404 and energy administration panel 403. Time of day clock 405 is a standard digital clock which generates digital output signals indicative of the present date/day of week/time and applies these digital output signals to appropriate conductors of cable 406. Similarly, power meter interface 404 monitors the operation of the utility company power meters P1-Ph and generates a digital representation of the present energy consumption and also applies these digital output signals to appropriate conductors of cable 406. Energy administration panel 403 is a keyboard equipped input/output device which permits the user to input and update various parameter and control instructions in the energy control system while also obtaining an output indicating the present system status. Energy administration panel 403 is also connected to appropriate conductors of cable and 406 also communicates with processor 402 via digital signals.

Cable 406 is connected to stored program time-division PBX 100 wherein it is terminated on processor 402. Processor 402 is the standard PBX controller which, in the case of a stored program time-division PBX, would be a small computer. Thus, processor 402 operates under control of instructions stored in program store 407 and, in the disclosed energy control system, part of these instructions constitutes an algorithm for calculating whether individual loads should be shed or restored. The energy control algorithm may be as complex as desired and typically would consider such factors as present energy consumption, long term demand, time of day, room status, outside temperature, etc. in determining how many loads should be operating and, in particular, which ones. Thus, processor 402 would take the digital information applied to cable 406 by energy administration panel 403, power meter interface 404, time of day clock 405 and any other such devices, along with line status information stored in line status memory 401 and, under control of the energy control algorithm stored in program store 407, calculate which loads should be operating. The updated load information is stored in line status memory 401 as a bit associated with each line circuit (LC00-LCn) identification code indicating whether or not the load associated with that line should be operating.

Load control is achieved, as previously mentioned, by the application of an audio frequency tone signal to the communication pair associated with a particular load. This can be better illustrated by describing the operation of a single energy control unit in the system. For example, assume the same situation as previously discussed with respect to FIG. 1, that is, energy control unit EC00 associated with communication pair T00, R00 is to be activated to shed the load comprised of heating and air conditioning unit L00. Processor 402 periodically conducts an audit to check the status of each line in the system and determine if the present status differs from that stored in line status memory 401. Assume that processor 402 has run the energy control algorithm and, as a consequence, has changed the status of the energy control bit in line status memory 401 associated with line circuit LC00 and energy control unit EC00 (which is connected to line circuit LC00 via communication pair T00, R00) to indicate that load L00 should be shed. Thus, during the status audit, processor 402 determines that the present status of line circuit LC00 differs from that indicated by line status memory 401. Processor 402 activates appropriate circuitry to modify the status of line circuit LC00. In particular, processor 402, in well-known fashion, causes line circuit LC00 to be connected to tone trunk 101 via a predetermined time slot of switching network bus 102. All line circuits associated with a load that is shed or deactivated are concurrently connected to tone trunk 101 via the same predetermined time slot of switching network bus 102. Thus, tone trunk 101 simultaneously applies the selected audio frequency signal (440 Hz) to communication pair T00, R00 as well as to all other communication pairs associated with shed loads. Communication pair T00, R00 carries the audio frequency signal (440 Hz) to energy control unit EC00 where it is applied to the input of tone detector 200.

TONE DETECTOR 200

Tone detector 200 consists of two stages, the first stage functioning to isolate energy control unit EC00 from the communication pair. The first stage contains a single pole low pass filter comprised of capacitors 210, 212, 218, 219 resistors 215, 211, 213, 214, 217 and operational amplifier 216. The first stage filters the incoming signal and also provides the gain necessary for the operation of the second stage which is a phase locked loop comprised of resistors 221, 223, capacitors 222, 224, 225 and phase locked loop 220. Tone detector 200 must detect the 440 Hz control signal within a particular range of voltages with the maximum signal appearing on the communication pair T00, R00 when there is an essentially zero length loop with no leakage and only one line connected to the tone trunk. Conversely, the minimum signal occurs when there is a maximum length loop, worst case leakage, and all the lines in the system are simultaneously connected to the tone trunk. Thus, when these factors are taken into consideration, the maximum and minimum signals can be calculated and these values are used to determine the gain of the first stage and also the appropriate values for the devices employed therein.

Tone detector 200 contains capacitor 210, 212 to block the dc bias current appearing on the communication pair T00, R00 from passing to the remainder of tone detection circuit 200. These capacitors are large and can therefore be ignored in the above-mentioned gain calculations. Resistors 211, 213 provide a high input impedance and help protect operational amplifier 216 from surge currents caused by lightning strikes on the communication pair T00, R00. Resistors 214, 215 bias the negative input terminal of operational amplifier 216 thereby allowing operational amplifier 216 to be powered by a single supply voltage. Feedback impedance comprised of resistor 217 and capacitor 218 functions as a low pass filter, providing the need gain at the frequency desired (440 Hz). This low pass filter is desirable because the second stage of tone detector 200 may erroneously detect harmonics of this desired frequency which arrive at high signal levels.

The output of operational amplifier 216 is passed through capacitor 219 to phase locked loop 220 of the second stage. Phase locked loop 220 is a standard commercially available circuit which employs resistor 221 and capacitor 222 to determine the center of the frequency band that phase locked loop 220 will detect while capacitor 224 sets the bandwidth. Capacitor 225 determines the time constant of phase locked loop 220 while resistor 223 provides an output pull up resistor. The output of this circuit is lead NOTN which lead indicates the presence/absence of tone on the communication pair T00, R00 by assuming a low/high state respectively.

HOOK STATUS DETECTOR 202

Also connected to communication pair T00, R00 is hook status detector 202 which determines the on-hook/off-hook status of associated telephone station set ST00. Hook status detector 202 consists of polarity guard diodes 230–233 and four resistance bridge resistors 227, 228, 229, 234 and operational amplifier 236 which serves as a voltage comparator. Operational amplifier comparator 236 employs positive feedback through resistor 235 to prevent the output from chattering when the input signal is near the voltage threshold. Resistors 227 and 229 provide a high input impedance to protect the input terminals of operational amplifier 236 from current surges due to lightning strikes on communication pair T00, R00 while resistors 228 and 234 are selected to establish the required voltage threshold. Thus, the dc voltage level appearing on communication pair T00, R00 is passed through polarity guard diodes 230–233 and compared with a fixed threshold voltage to determine whether the associated telephone station set is on-hook or off-hook. The output of hook status detector 202 is lead OFHK which indicates the off-hook/on-hook status of telephone station set ST00 by presenting a high/low signal respectively.

POWER SUPPLY 300

Energy control unit EC00 is connected to the 60 Hz power line from which it derives its internal power. Power supply 300 contains transformer 310 which converts the 120 volt 60 Hz line voltage to a low voltage 60 Hz signal which is halfwave rectified by diode 311 and filtered by low pass filter comprised of resistor 313 and capacitor 314 and then applied to zener diode 315 to provide voltage V to the remaining circuitry of energy control unit EC00. The low voltage 60 Hz signal from transformer 310 is also passed through a low pass filter comprised of resistor 312 and capacitor 316 to lead 60P where it functions as a clock signal.

TIMING CIRCUIT 301

The 60 Hz clock signal appearing on lead 60P is applied through gate 317 of timing circuit 301 to 14-bit binary counter 318. Counter 318 will count the 60 Hz pulse output from gate 317 until its Q14 output goes high thereby disabling gates 317 stopping the clock signals from activating counter 318. Counter 318 may also be disabled by a reset pulse appearing on lead TRS which signal will clear counter 318. The reset signal is a very short pulse which disables the counter only momentarily. The counter is reset to all zeros, but it immediately starts counting again and continues to count until it eventually brings Q14 high. Several reset signals may be received in the process, but the primary disable signal is a high on Q14.

TRANSITION DETECTOR 203

The output of both tone detector 200 and hook status detector 202 are applied to transition detector 203 which provides the logic to control timing circuit 301. Energy control circuit EC00 is to be activated only when the 440 Hz control signal is present on communication pair T00, R00 and the associated telephone station set ST00 is on-hook. These two required conditions are indicated by low signals appearing on leads NOTN and OFHK respectively. Thus, when these conditions are satisfied, the output of gate 237 of transition detector 203 is high, providing a high input to the D terminal of flip-flop 238. Meanwhile, gate 242 is enabled thereby passing the 60 Hz clock signal from lead 60P to the clock input of flip-flop 238. Thus, with the D-input of flip-flop 238 high, the logic level of the D-input will be transferred to the Q output by the next clock pulse which will arrive within 16.7 ms after the D-input changes stage unless gate 242 is inhibited by a high signal on lead INS. Additional clock pulses have no effect until the level of the D-input is changed again. The high output signal on the Q terminal of flip-flop 238 clears flip-flop 247 after a short time delay which is determined by resistor 243 and capacitor 245 and the high output of the Q terminal of flip-flop 238 coupled with the high output of the Q terminal of flip-flop 247 activates gate 239 which switches gate 240 low, thus placing a high signal on lead TRS. This high signal on lead TRS has a very short duration which starts when the Q output of flip-flop 238 goes high and ends when the Q output of flip-flop 247 goes low. It is applied to the reset terminal of counter 318 of timing circuit 301 thereby resetting the counter to the zero state. However, counter 318 cannot begin to count the 60 Hz clock signal as presented by gate 317 until lead TRS switches low thereby enabling the counter to begin operating. Resistor 243 and capacitor 245 provide a time delay in which it momentarily prevents the propogation of the aforementioned high signal from the Q terminal of flip-flop 238 to the R input of flip-flop 247. When capacitor 245 finally charges to a high level, flip-flop 247 is reset turning off gate 239 which turns on gate 240 thereby placing a low signal on lead TRS which enables counter 318 of timing circuit 301 to begin counting. After flip-flop 247 has been cleared, gate 239 is inhibited and gate 241 is enabled by a high on the $\overline{Q}$ output of flip-flop 247. Lead TRS cannot be pulsed high again until the D input of flip-flop 238 changes to a low state and a clock pulse is allowed to pass through gate 242.

TIMING CIRCUIT 301

Timing circuit 301 now begins to count the 60 Hz clock signal as presented by gate 317 until the Q8 output of counter 318 goes high. This will take between 2.108 and 2.125 seconds after the counter was enabled by the low signal on lead TRS. This time delay prevents energy control unit EC00 from being erroneously triggered by noise on communication pair T00, R00. When the Q8 output of counter 318 goes high, a high is clocked into the Q terminal of flip-flop 319 which places a high signal on lead INS turning off gate 242 in transition detector 203 thereby inhibiting flip-flop 238 from recording changes in the state of the hook switch of the associated telephone station set ST00 or a change in the presence of tone on communication pair T00, R00. Thus, counter 318 acts as a time delay preventing the propagation of the enable signal on lead TRS for approximately two seconds. The high signal on lead INS also clocks flip-flop 320 thereby placing the present logic level at the Q output of flip-flop 238 on lead RLYE which signal is carried to energy control signal 303.

ENERGY CONTROL 303

Energy control 303 receives the signal appearing on lead RLYE and applies it through resistor 322 to the base terminal of the transistor 323. A high signal turns on transistor 323 and activates relay K1. Relay K1 has a set of transfer contacts (SPDT) (K1-1, K1-2) which are used to control the operation of the thermostat associated with the heating/air conditioning equipment.

Thus, the presence of tone on the communication pair is detected by tone detector 200 while the on-hook status telephone station set ST00 is detected by hook status detector 202 and these determinations are used by transition detector 203 to enable timing circuit 301. Timing circuit 301 delays for approximately two seconds before enabling energy control 303 which operates control relay K1 which turns off heating and air conditioning equipment L00 by overriding the thermostat of heating and air conditioning unit L00.

Control relay K1 will remain in this state since counter 318 continues to count the 60 Hz clock signals appearing on lead 60P until the Q14 output of counter 318 goes high turning off gate 317 and disabling counter 318 from continuing the count as described above. This takes approximately two minutes. During the time between Q8 going high and Q14 going high, the lead INS is high. Thus, the clock input to transition detector is inhibited. This prevents cycling the load more often than every two minutes. Loads such as compressors used in air conditioners can be damaged by restarting too soon after turnoff. The energy control circuit EC00 will remain in this state until either the telephone station set ST00 goes off-hook or the telephone switching system removes tone from the communication pair respectively, at which time the output of either hook status detector 202 or tone detector 200 will change to reflect this transition. A change in the output of either of these two circuits turns off gate 237 resetting flip-flip 238 which in turn sets flip-flop 247 placing a high signal on lead TRS which signal resets counter 318. As described above, lead TRS goes low after a time delay caused by resistor 245 capacitor 247 and when lead TRS changes, the counter 318 will again be enabled to count the 60 Hz clock pulses appearing on lead 60P. When the counter output Q8 changes, flip-flop 319 will be set, thereby resetting flip-flop 320. Flip-flop 320 disables energy control circuit 303 which causes control relay K1 to release, thereby returning control of the heating and air conditioning equipment L00 to the room thermostat. Thus, the return to thermostatic control occurs only after a time delay of approximately two seconds after the tone is removed from the communication pair or associated telephone station set goes off-hook.

CONTROL STATUS VERIFICATION 302

The above-described circuitry functions to control the operation of heating and air-conditioning equipment L00 but as it stands this circuit lacks the capability to indicate the present status of control relay K1. Additional circuitry has therefore been provided to indicate the operation/nonoperation of control relay K1 by verifying the presence/absence of current through the coil of control relay K1. Testing for current in the relay coil does not verify that the relay contacts have operated properly, however, it is a good test that can easily be implemented while allowing the contacts to serve a useful purpose.

The verification procedure consists of two signals, which are a query sent from the PBX to the energy control unit EC00 and a response from energy control unit EC00 to the telephone switching system. During the test procedure, telephone station set ST00 must be on-hook since the query consists of four timed transitions in the tone state. There obviously are two cases to test for, the first being where initially there is tone on the communication pair and the controller relay K1 is operated while the second case is where initially there is no tone present on the communication pair and control relay K1 is released. In the first situation, with tone present and control relay K1 activated, a change in the status of the tone would entail removing the tone from the communication pair thereby as discussed above resetting counter 318. Once counter 318 is reset, it begins to time again and will release control relay K1 if the Q8 state is reached in the count. Therefore, the telephone switching system must reapply tone to the communication pair after at least 1.1 seconds but before 2.1 seconds during which time interval counter 318 has reached the Q7 state. Counter 318 reaching the Q7 state places a count of one in the binary counter comprised of flip-flops 325 and 328 which are located in control status verification circuit 302. As discussed above, reapplication of the tone to the communication pair resets counter 318 and the count again begins. Once again, the state of the tone is switched after 1.1 seconds and before 2.1 seconds so that the Q7 output of counter 318 is activated and another count is stored in the binary counter comprised of flip-flops 325 and 328. This sequence of transitions continues until a count of three is reached at which time flip-flop 327 is set and a high signal appearing on its Q output terminal activates transistor 334 drawing current through the coil of verification relay K2.

STATUS RESPONSE 201

The make contact K2-1 of relay K2 is located in status response circuit 201. This unit functions to place a resistive load comprised of resistor 226 across the communication pair T00, R00 when relay K2 is operated thereby providing an off-hook signal back to the telephone switching system where it is detected. The duration of this off-hook signal is determined by the status of control relay K1. If current is passing through the coil of control relay K1, lead RON is high and when counter 318 reaches the Q4 state, gate 330 is turned on which turns off gate 331 which resets flip-flop 327 turning off verification relay K2. If there is no current through the coil of control relay K1, lead RON remains low maintaining gate 330 off. Now, when counter 318 reaches the Q6 state, gate 329 is turned on which turns off gate 331 which resets flip-flop 327 turning off verification relay K2. Thus, the duration of the off-hook status response is determined by the presence or absence of current through the coil of control relay K1 which is combined with the outputs of counter 318.

If initially no tone were present on communication pair T00, R00, flip-flop 320 would be reset and control relay K1 would be released and counter 318 would be set in the Q14 state. As discussed above, the short tone bursts applied to the communication pair by the telephone switching system once again allowing counter 318 to reach the Q7 state adding counts to binary counter comprised of flip-flop 325 and 328. The response back to the telephone switching system operation would be as described above. Thus, energy control unit EC00 monitors the tone transitions for both quantity and duration and, if the proper sequence of tone bursts are received, the status of control relay K1 is returned to the telephone switching system in the form of one of two possible timed off-hook signals indicating the operation/nonoperation of control relay K1 back to the PBX. Three transitions of the tone state are required to initiate a response to the query. The fourth transition is required to place the tone back to the original state and prevent a change in the status of control relay K1.

While a specific embodiment of the invention has been disclosed, variations in procedural and structural detail, within the scope of the appended claims, are possible and are contemplated. There is no intention of limitation to what is contained in the abstract or the exact disclosure as herein presented. The above-described arrangements are only illustrative of the application of the principles of our invention. Normally, other arrangements may be devised by those skilled in the art without departing from the spirit and the scope of our invention.

We claim:

1. A control system for overriding the normal control of devices (L00–Ln) each of which is located at one of a plurality of sites, each of said sites having associated with it a communication pair (T00, R00–Tn, Rn), the system comprising:

generation means (101) for producing an audio frequency tone having a predetermined frequency;

distribution means (100) connected to both said communication pairs (T00, R00–Tn, Rn) and said generation means (101) for concurrently applying said audio frequency tone to each of said communication pairs (T00, R00–Tn, Rn) associated with a site containing one of said devices (L00–Ln) the normal control of which is to be overridden;

a plurality of control means (EC00–ECn), each of which is connected to one of said communication pairs (T00, R00–Tn, Rn), associated on a one-to-one basis with said devices (L00–Ln), for overriding the normal control of said devices (L00–Ln) wherein each said control means (EC00–ECn) includes:

detection means (200) for providing an indication of the presence of said applied audio frequency tone signal on said associated communication pair (T00, R00), wherein each of said detection means (200) is connected to said associated communication pair (T00, R00);

switch means (303) responsive to said detection means (200) indication for overriding the normal control of said device L00 associated with said control means (EC00); and wherein said distribution means (100) comprises a telephone communication system which is responsive to an algorithm stored therein for overriding the normal control of said devices (L00–Ln).

2. The invention of claim 1 wherein said distribution means (100) includes a time division switching matrix; wherein all said communication pairs (T00, R00, Tn, Rn) associated with sites containing devices (L00–Ln) the normal control of which is to be overridden are connected to a single time slot in said time division switching matrix (102); and wherein said generation means (101) is additionally connected to said single time slot.

3. The invention of claim 2 wherein said generation means (101) comprises a tone trunk in said telephone communication system (100), 4. The invention of claim 1 wherein said control means (EC00) includes: switchhook status means (202) reponsive to the on-hook condition of said associated communication pair (T00, R00) for generating an on-hook status signal time delay means (301) responsive to the concurrent persistence of both said on-hook status signal and said detection means indication for greater than a first predetermined interval of time (2 seconds) for enabling said switch means (303);

wherein said time delay means (301), having enabled said switch means (303), is unresponsive to the presence/absence of both said on-hook status signal and said detection means indication for a second predetermined interval of time (2 minutes); and wherein said time delay means (301) is responsive, after the elapse of said second predetermined interval of time (2 minutes), to the absence of said on-hook status signal or said detection means indication for greater than said first predetermined interval of time (2 seconds) for disabling said control means (EC00).

5. The invention of claim 4 wherein said control means (EC00) includes relay means (K2) responsive to said time delay means (301) for disabling said switch means (303), thereby terminating the overriding of the normal control of said device.

6. The invention of claim 1 wherein said control means (EC00) includes status verification means (201, 302) which are responsive to a predetermined distinctive status inquiry signal applied to said associated communication pair (T00, R00) by said distribution means (100) for generating a status indication signal indicating the activated/deactivated state of said control means.

7. The invention of claim 6 wherein said status indication signal comprises a timed off-hook signal applied to said associated communication pair (T00, R00) by said status verification means (201, 302).

8. The invention of claim 6 wherein said status inquiry signal comprises a predetermined number of timed bursts of said audio frequency tone to said associated communication pair (T00, R00).

* * * * *